(12) United States Patent
Peng et al.

(10) Patent No.: US 11,930,567 B2
(45) Date of Patent: Mar. 12, 2024

(54) LIGHTING APPARATUS

(71) Applicant: XIAMEN LEEDARSON LIGHTING CO.,LTD, Fujian (CN)

(72) Inventors: Wenjin Peng, Fujian (CN); Junjie Lin, Fujian (CN); Lei Zhang, Fujian (CN); Chunteng Chen, Fujian (CN); Ruixiang Lin, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 498 days.

(21) Appl. No.: 17/243,067

(22) Filed: Apr. 28, 2021

(65) Prior Publication Data

US 2021/0337640 A1    Oct. 28, 2021

(30) Foreign Application Priority Data

Apr. 28, 2020 (CN) .......................... 202020674198.2

(51) Int. Cl.
*H05B 45/10* (2020.01)
*H05B 47/16* (2020.01)
*H05B 47/17* (2020.01)

(52) U.S. Cl.
CPC ............. *H05B 45/10* (2020.01); *H05B 47/16* (2020.01); *H05B 47/17* (2020.01)

(58) Field of Classification Search
None
See application file for complete search history.

(56) References Cited

U.S. PATENT DOCUMENTS

2018/0319320 A1* 11/2018 Tatara ................... B60Q 1/507
2023/0007140 A1*  1/2023 Sugai ....................... H04N 1/23

\* cited by examiner

*Primary Examiner* — Dedei K Hammond
(74) *Attorney, Agent, or Firm* — Chun-Ming Shih; LANWAY IPR SERVICES

(57) ABSTRACT

A lighting apparatus includes a first set of LED modules, a second set of LED modules, a first lens, a second lens and a driver. The first lens covers the first set of LED modules. The second lens covers the second set of LED modules. The driver supplies a first driving current and a second driving current respectively to the first set of LED module and the second set of LED modules. The driver electively turns on and turns off the first set of LED modules and the second set of LED modules in a first mode and in a second mode. The first light span in the first mode is partially overlapping the second light span in the second mode. The first light span has a smaller span angle than the second light span.

20 Claims, 14 Drawing Sheets

LIGHTING APPARATUS

FIELD

The present invention is related to a lighting apparatus, and more particularly related to a lighting apparatus with adjustable light span.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

People would like various light settings but it is usually difficult to implement a flexible design while keeping low manufacturing cost.

Therefore, it is important and beneficial to design a flexible light device with multiple settings that are achieved in low cost to satisfy different needs dynamically.

SUMMARY

In some embodiments, a lighting apparatus includes a first set of LED modules, a second set of LED modules, a first lens, a second lens and a driver.

The first lens covers the first set of LED modules.

The second lens covers the second set of LED modules.

The driver supplies a first driving current and a second driving current respectively to the first set of LED module and the second set of LED modules. The driver electively turns on and turns off the first set of LED modules and the second set of LED modules in a first mode and in a second mode.

In the first mode, the first set of LED modules are turned on and the second set of LED modules are turned off. The first lens guides a first light of the first set of LED modules to form a first light span.

In the second mode, the second set of LED modules are turned on and the first set of LED modules are turned off. The second lens guides a second light of the second set of LED modules to form a second light span.

The first light span is partially overlapping the second light span and has a smaller span angle than the second light span.

In some embodiments, the first light span is completely covered the second light span.

In some embodiments, the second light has a lower color temperature than the first light.

In some embodiments, the first set of LED modules and the second set of LED modules are not turned on at the same time.

In some embodiments, the first lens has multiple sub-lenses respectively covering each of the first set of LED modules.

The multiple sub-lenses have different guiding angles with respect to an installation plane for mounting the first set of LED modules.

In some embodiments, the first set of LED modules and the second set of LED modules are arranged in an alternating order.

In some embodiments, the driver controls a first intensity of the first set of LED modules and controls a second intensity of the second set of LED modules to adjust an output light span of the lighting apparatus.

In some embodiments, the lighting apparatus may also include a third set of LED modules to emit a main light.

The main light accompanies the first light or the second light to form an output light span.

In some embodiments, the first set of LED modules and the second set of LED modules emit different light colors.

In some embodiments, the first set of LED modules and the second set of LED modules are the same type of LED modules placed on a single light source plate while respectively facing the first lens and the second lens of different parameters.

In some embodiments, the first lens and the second lens are formed on a single lens plate.

In some embodiments, the first lens and the second lens are detachably attached to the lighting apparatus to be selectively replaced with lenses of another parameter.

In some embodiments, the lighting apparatus may also include a central bar housing for disposing the driver.

The central bar housing has connectors to insert the first set of LED modules and the second set of LED modules.

In some embodiments, two side housings are connected on two opposite sides of the central bar housing for holding the first set of LED modules and the second set of LED modules.

In some embodiments, the side housings are detachably connected to the central bar housing to be replaced with another side housings if a different number of the first set of LED modules and the second set of LED modules are inserted.

In some embodiments, a third set of the LED modules are disposed on the central bar housing to generate a main light.

In some embodiments, the first set of LED modules and the second set of LED modules are composed of multiple light modules to be attached to the central bar for receiving the driving current.

In some embodiments, the first set of LED modules and the first lens are integrated as a first module.

The second set of LED modules and the second lens are integrated as a second module.

The first module and the second module are detachably plugged to the central housing.

In some embodiments, the first set of LED modules are disposed at a center position of the lighting apparatus and the second set of LED modules are disposed at a peripheral position of the lighting apparatus.

In some embodiments, the driver determines to switch to the first mode or the second mode according to a motion detection message indicating whether there is an object around the lighting apparatus.

DETAILED DESCRIPTION

Figure 1:
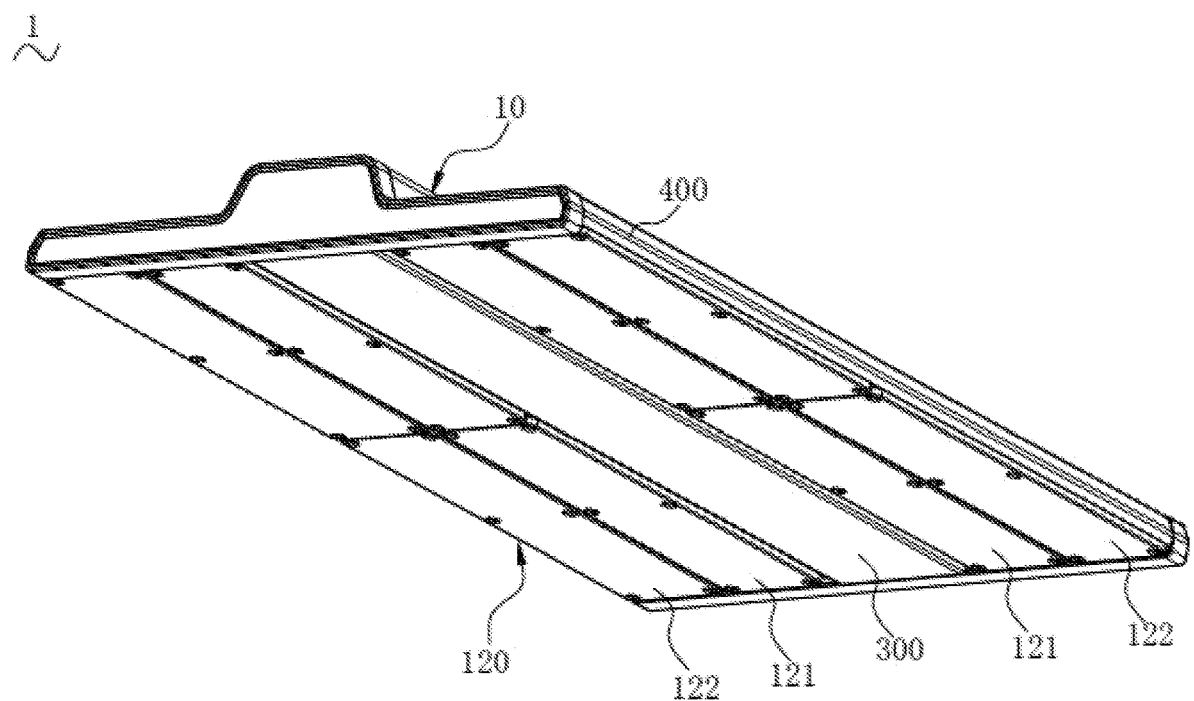
FIG. 1 illustrates a lighting apparatus embodiment.

In some embodiments, a lighting apparatus includes a first set of LED modules 602, a second set of LED modules 603, a first lens 608, a second lens 609 and a driver 601.

The first lens 608 covers the first set of LED modules 602. The second lens 609 covers the second set of LED modules 603.

In some embodiments, the first set of LED modules 602 may have multiple LED modules that are the same types of LED modules or include multiple types of LED modules. Each LED module may include one or more LED chips that emit light when receiving a driving current. LED refers to Light Emitted Diode components that converts electricity to light.

The driver 601 supplies a first driving current and a second driving current respectively to the first set of LED module and the second set of LED modules. The driver electively turns on and turns off the first set of LED modules 602 and the second set of LED modules 603 in a first mode and in a second mode.

In the first mode, the first set of LED modules are turned on and the second set of LED modules are turned off. The first lens guides a first light of the first set of LED modules to form a first light span.

In the second mode, the second set of LED modules are turned on and the first set of LED modules are turned off. The second lens guides a second light of the second set of LED modules to form a second light span.

Figure 16:
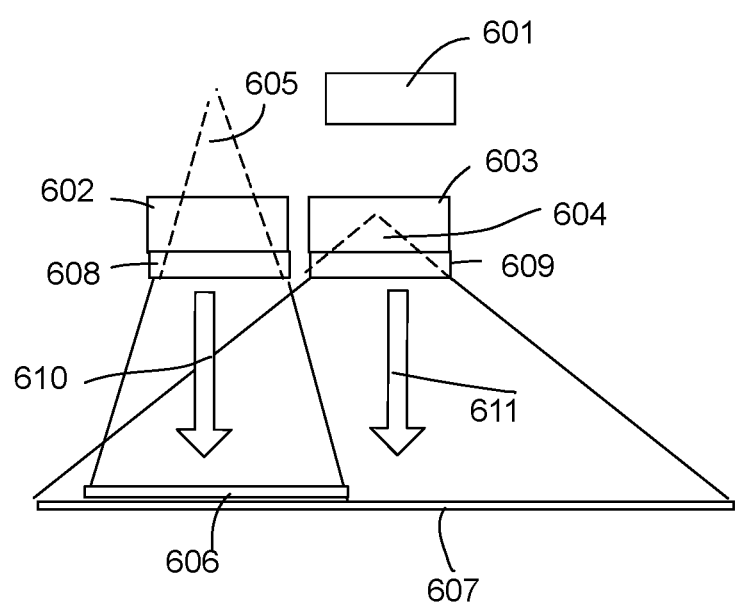
FIG. 16 illustrates another embodiment.

In FIG. 16, the first set of LED modules 602 and the first lens 608 together form a first light span 606 which may have different projection shapes and intensities according to different planes to be projected. The second set of LED modules 603 and the second lens 609 together form a second light span 607. The first lens 608 and the second lens 609 may be optical units that change light paths when passing through the first lens 608 and the second lens 609. The first lens 608 and the second lens 609 may have multiple micro lens together form an optical unit to achieve the required light path direction function.

The first light span is partially overlapping the second light span and has a smaller span angle than the second light span.

In FIG. 16, the first light span 606 corresponds to a first span angle 605 that has smaller than the second span angle 604 corresponding to the second light span 607.

In some embodiments, the first light span is completely covered the second light span. An example can be found in the example of FIG. 7.

In some embodiments, the second light 611 has a lower color temperature than the first light 610. In other words, in addition to different light span areas, the first light 610 and the second light 611 may have different color temperatures or colors.

In some embodiments, the first set of LED modules and the second set of LED modules are not turned on at the same time. In such case, the driver 601 may have a constant current circuit for supplying a driving current that is supplied either to the first set of LED modules or the second set of LED modules, and does not supply to both sets of LED modules at the same time. For example, a PWM control may be implemented in the driver to allow the driving current supplied to the first set of LED modules when the PWM signal is at low level and supplied to the second set of LED modules when the PWM signal is at high level. The constant current circuit and PWM design may adopt common designs and modify these concepts to achieve the present invention based on the description provided here.

Figure 19:
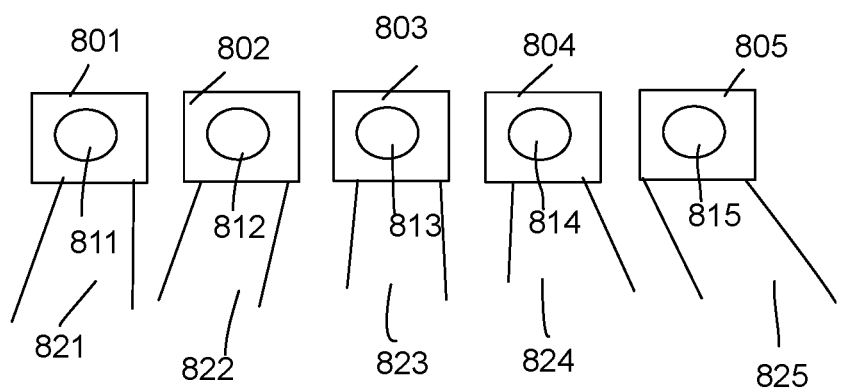
FIG. 19 illustrates light span for each LED module in the first set of LED modules.

In FIG. 19, the first lens has multiple sub-lenses 801, 802, 803, 804, 805 respectively covering each of the first set of LED modules 811, 812, 813, 814, 815.

The multiple sub-lenses 801, 802, 803, 804, 805 have different guiding angles 821, 822, 823, 824, 825 with respect to an installation plane for mounting the first set of LED modules. In other words, in some embodiments, the first set of LED modules may have the same type of LED module but their corresponding sub-lenses may direct lights to different direction to achieve an overall required light pattern effect. Specifically, the middle sub-lenses may direct light downwardly while the peripheral sub-lenses may direct light with different tilt angles.

Figure 17:
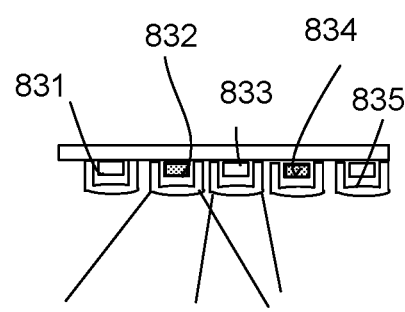
FIG. 17 illustrates an arrangement example of the first set of LED modules and the second set of LED modules.
Figure 18:
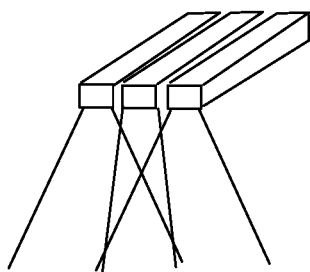
FIG. 18 illustrates an arrangement of elongated light modules.

In some embodiments, the first set of LED modules and the second set of LED modules are arranged in an alternating order. In FIG. 17, LED modules 831, 833, 835 of the first set of LED modules are arranged in an alternating order to mix with LED modules 832, 834 of the second set of LED modules. This is an example showing that there are multiple arrangement of the LED modules of the first set of LED modules and the second set of LED modules to meet different requirements. For example, the arrangement in FIG. 17 makes the mixed light more evenly and provides a better light pattern in different modes.

In some embodiments, the driver controls a first intensity of the first set of LED modules and controls a second intensity of the second set of LED modules to adjust an output light span of the lighting apparatus. In such design, the first set of LED modules and the second set of LED modules may be controlled in a third mode in which both sets of LED modules are turned on but with different relative intensities, which render a different light span in the area C in FIG. 7.

In some embodiments, the lighting apparatus may also include a third set of LED modules to emit a main light.

Figure 20:
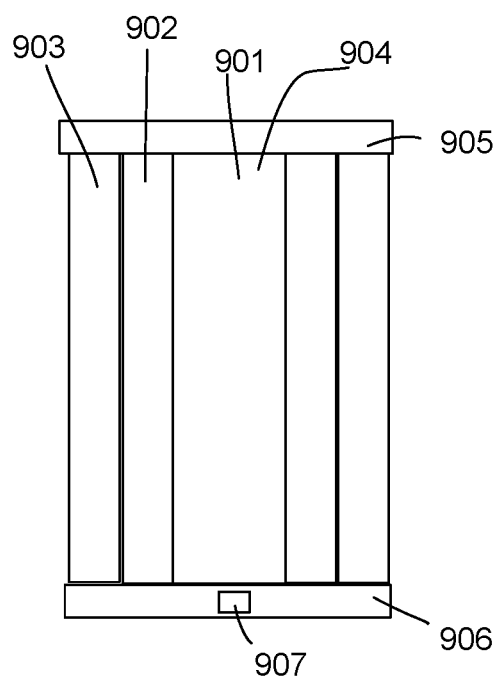
FIG. 20 illustrates a module design of another embodiment.

For example, in FIG. 20, a central bar housing 904 has a third set of LED modules 901 to emit a main light downwardly. A first set of LED modules 902 and a second set of LED modules 903 are disposed aside to be controlled to adjust a final output light span.

The main light accompanies the first light or the second light to form an output light span.

In some embodiments, the first set of LED modules and the second set of LED modules emit different light colors.

In some embodiments, the first set of LED modules and the second set of LED modules are the same type of LED modules placed on a single light source plate while respectively facing the first lens and the second lens of different parameters.

In some embodiments, the first lens and the second lens are formed on a single lens plate.

In some embodiments, the first lens and the second lens are detachably attached to the lighting apparatus to be selectively replaced with lenses of another parameter.

In FIG. 20, the lighting apparatus may also include a central bar housing 904 for disposing the driver.

The central bar housing has connectors to insert the first set of LED modules 902 and the second set of LED modules 903.

In some embodiments, two side housings 905, 906 are connected on two opposite sides of the central bar housing 904 for holding the first set of LED modules 902 and the second set of LED modules 903.

Figure 14:
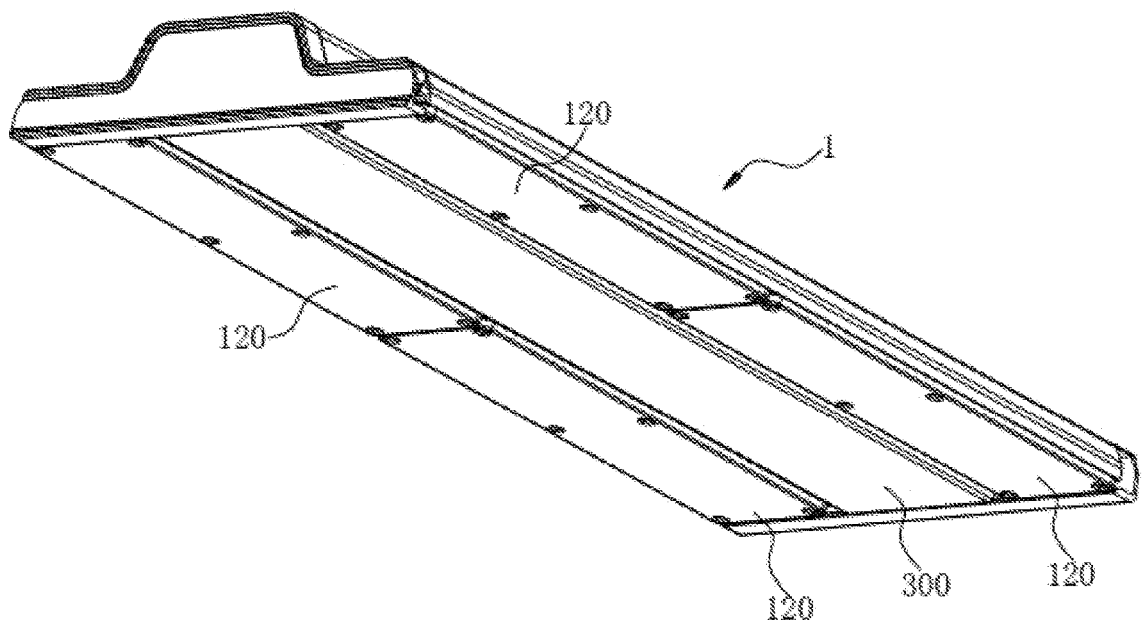
FIG. 14 illustrates an assembled configuration.
Figure 15:
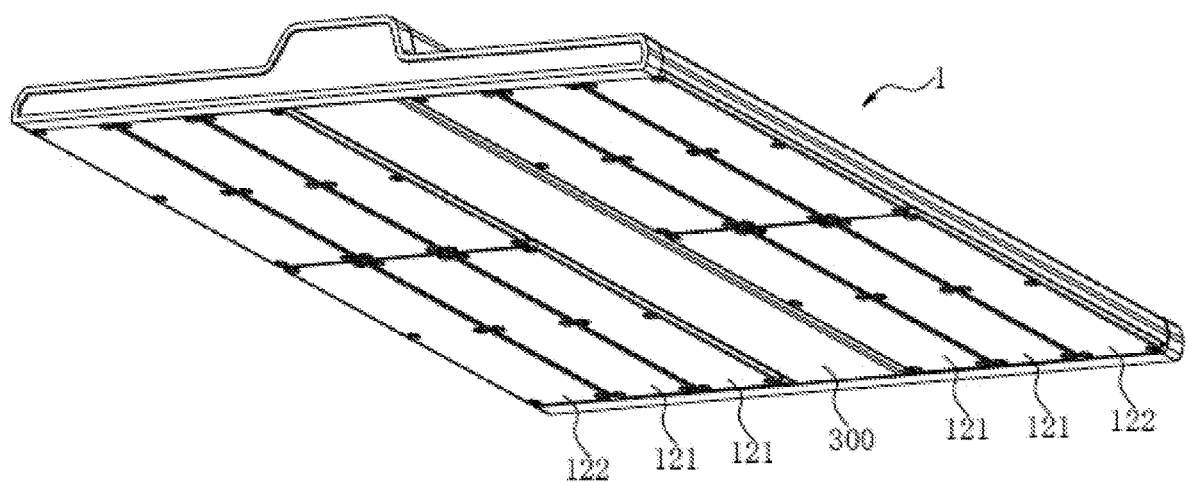
FIG. 15 illustrates another assembled configuration.

In some embodiments, the side housings 905, 906 are detachably connected to the central bar housing 904 to be replaced with another side housings 905, 906 if a different number of the first set of LED modules and the second set of LED modules are inserted. FIG. 14 and FIG. 15 show two examples of different number of attached LED modules while using the same central bar housing. Such design adds flexibility of the components and decreases overall cost.

In some embodiments, a third set of the LED modules are disposed on the central bar housing to generate a main light.

In some embodiments, the first set of LED modules and the second set of LED modules are composed of multiple light modules to be attached to the central bar for receiving the driving current.

In some embodiments, the first set of LED modules and the first lens are integrated as a first module.

The second set of LED modules and the second lens are integrated as a second module.

The first module and the second module are detachably plugged to the central housing. The examples are illustrated in FIGS. 9-15 explained in following disclosure.

In some embodiments, the first set of LED modules are disposed at a center position of the lighting apparatus and the second set of LED modules are disposed at a peripheral position of the lighting apparatus.

In FIG. 20, the driver determines to switch to the first mode or the second mode according to a motion detection message, e.g. via a motion detector sensor 907, indicating whether there is an object around the lighting apparatus.

The motion detector sensor 907 may be an infrared sensor or a microwave sensor to detects whether there is a human appearing below the lighting apparatus.

Please refer to FIG. 1, which illustrates a lighting apparatus embodiment.

In FIG. 1, the lighting apparatus 1 has a central bar housing 300. The first set of LED modules and associated first lens are made of multiple first light modules 121. The second set of LED modules and associated second lens are mad of multiple second light modules 122 mounted to the central bar housing 300. These light modules 120 may be added to the central bar housing 300 according to different requirements, e.g. different color temperatures, different colors, different number of light modules. There is a heat sink plate 400 for holding LED modules and for providing heat dissipation.

Figure 2:
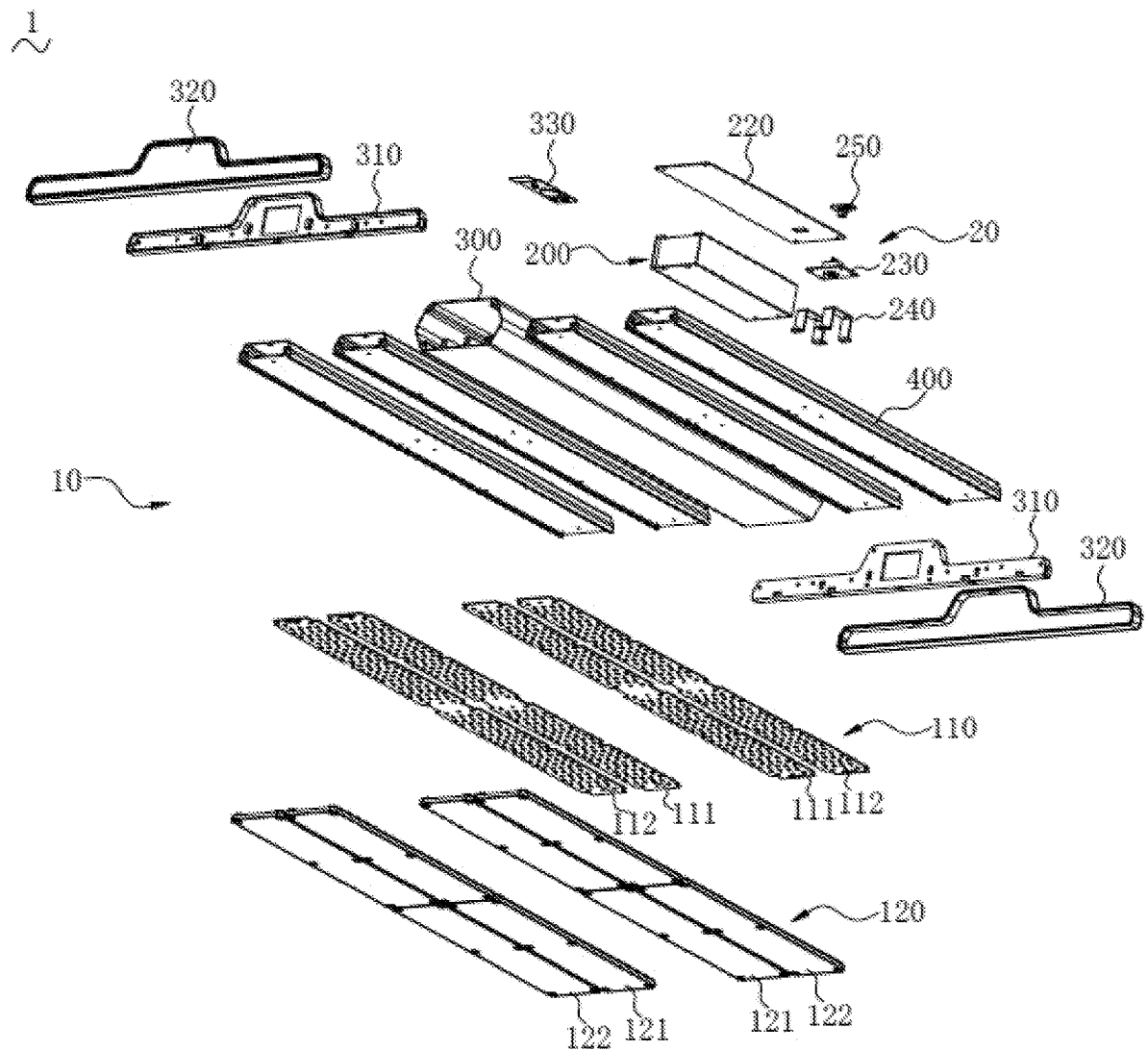
FIG. 2 illustrates an exploded view of a lighting apparatus in FIG. 1.

FIG. 2 shows an exploded view of the example in FIG. 1. The same reference numerals refer to the same components in following description.

In FIG. 2, a decoration cover 320 is attached to an end cover 310 to form a side housing mentioned above. There is a wire cover 330 for connecting to a power wire. There is a driver cover 220 covering a driver box 200 to contain a driver component 20 to form a driver.

There is a control switch 230 to manually set a setting for control the driver. There is a switch bracket 240 for holding the switch 230.

The central bar housing 300 is attached to multiple heat sink plates 400. The first set of LED modules 111 and the second set of LED modules 112 are disposed on light source plates 110 and covered by lens to form light modules 120.

Figure 3:
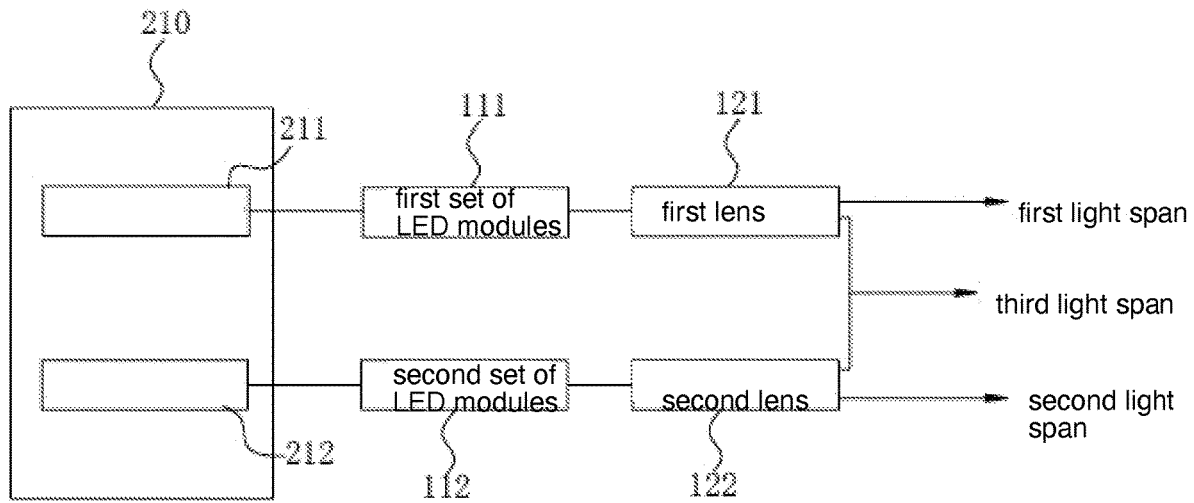
FIG. 3 illustrates a system diagram of the example in FIG. 1.

FIG. 3 shows a system diagram.

In FIG. 3, the driver 210 includes a first driver module 211 and a second driver module to generate driving currents to the first set of LED modules 111 and the second set of LED modules 112. The first lens 121 and the second lens 122 direct the output light to form a first light span, a second light span and a third light span. The third light span may be a mixed light pattern by mixing the first set of LED modules 111 and the second set of LED modules 112.

Figure 4:
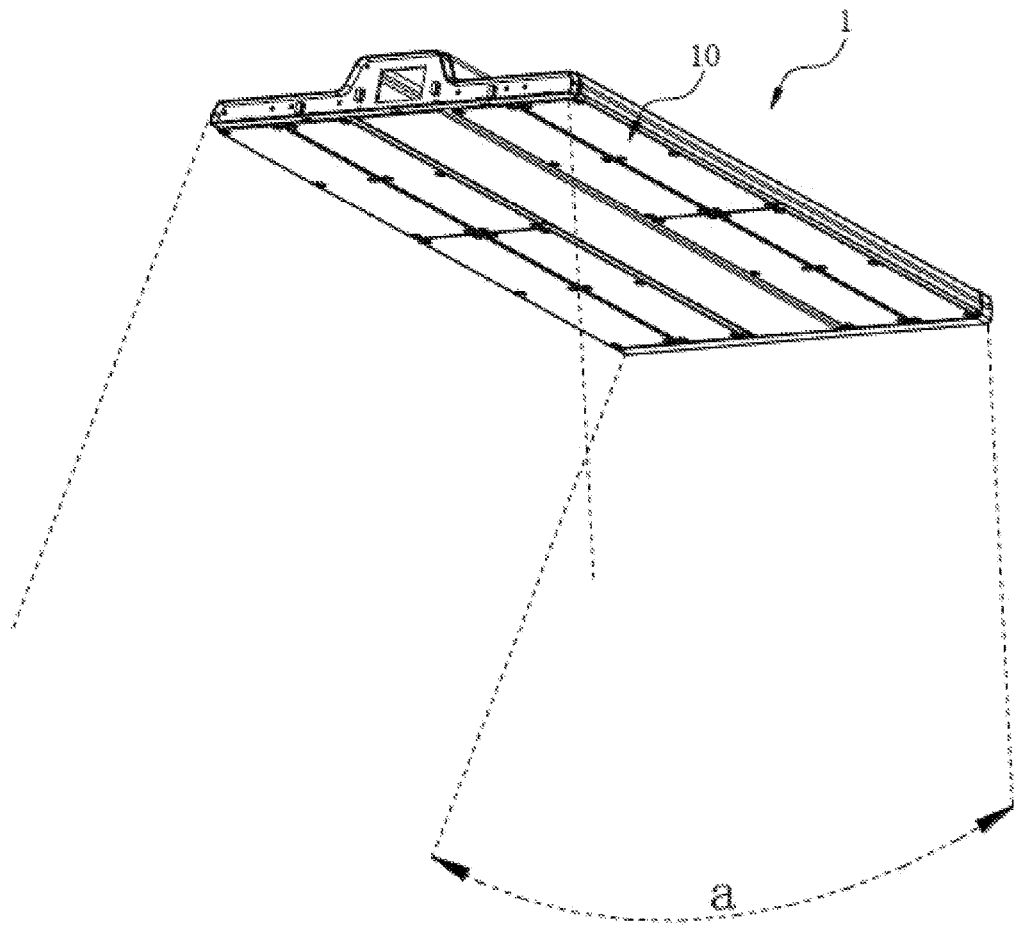
FIG. 4 illustrates a lighting apparatus with an illustrated light span.

FIG. 4 shows a first light span a when the first set of LED modules are turned on. The light body 10 are a mixing combination of the first set of LED modules and the second set of LED modules.

Figure 5:
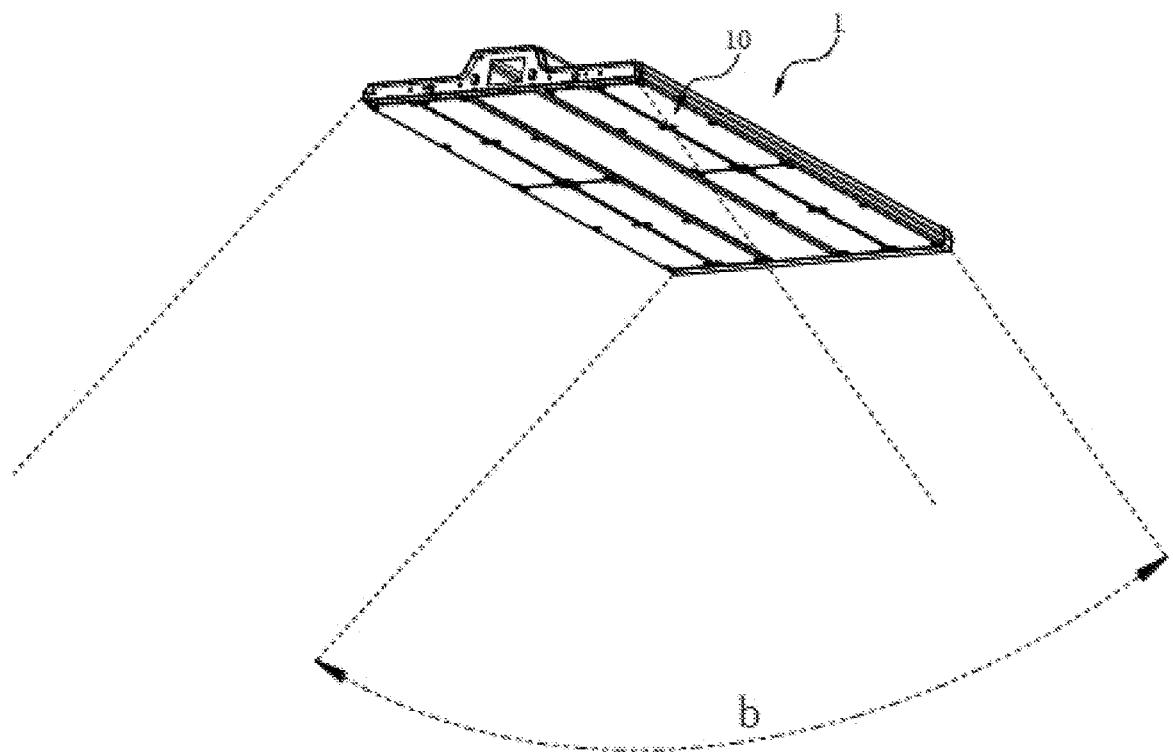
FIG. 5 illustrates a lighting apparatus with another illustrated light span.
Figure 6:
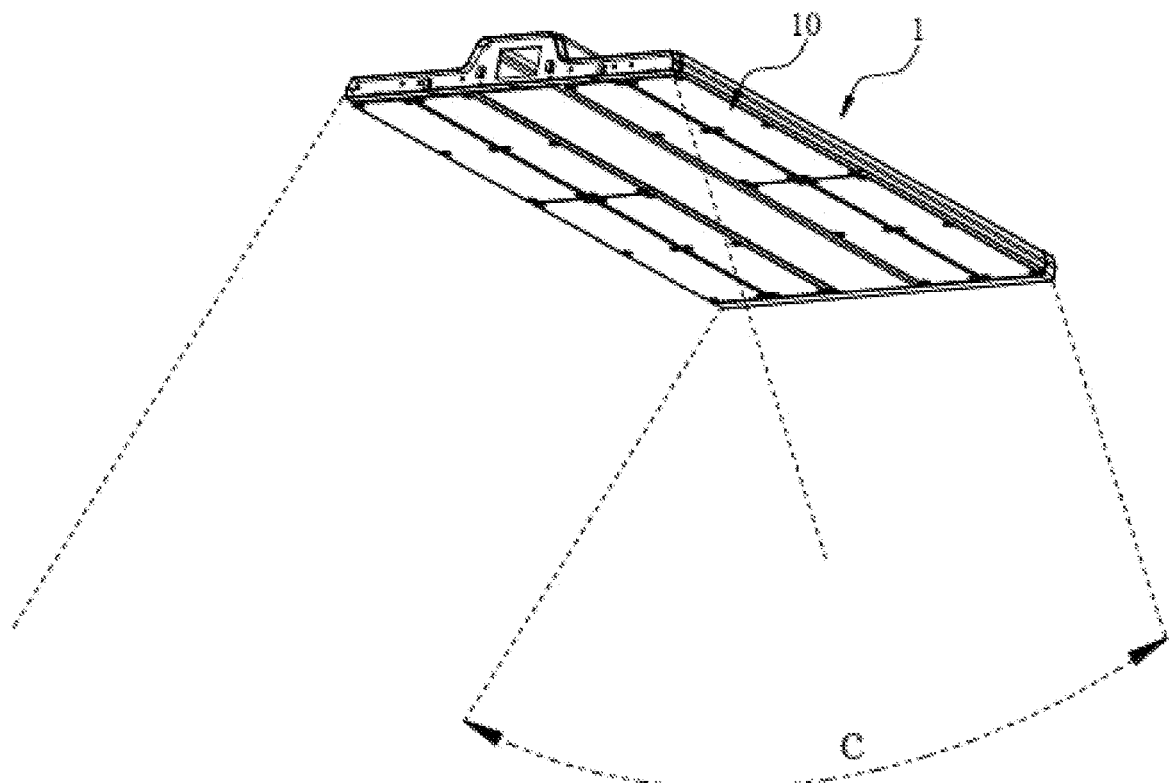
FIG. 6 illustrates a lighting apparatus with another illustrated light span.

FIG. 5 shows a second light span b when the second set of LED modules are turned on. FIG. 6 shows a third light span c when both the first set of LED modules and the second set of LED modules are turned on.

Figure 7:
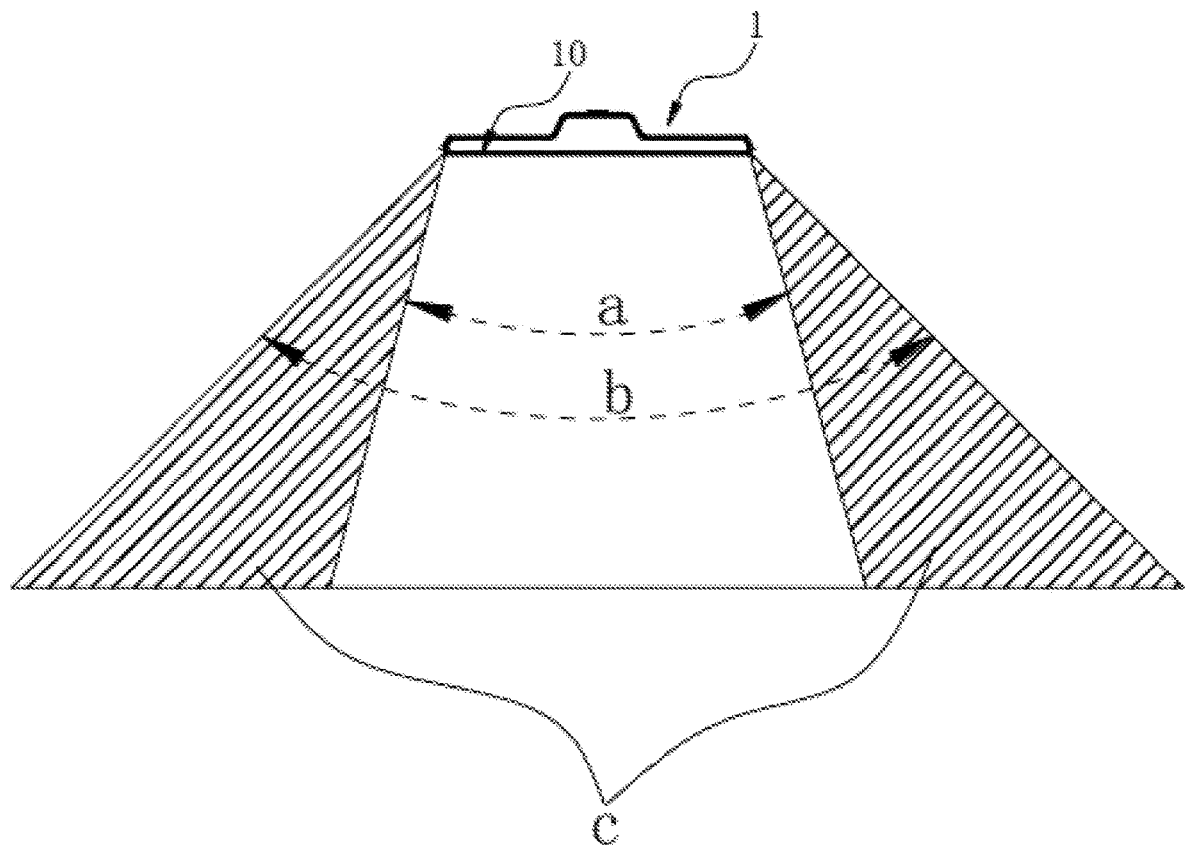
FIG. 7 illustrates light span replacement example.

FIG. 7 shows a comparison of light spans a, b, c shown in FIG. 4 to FIG. 6.

Figure 8:
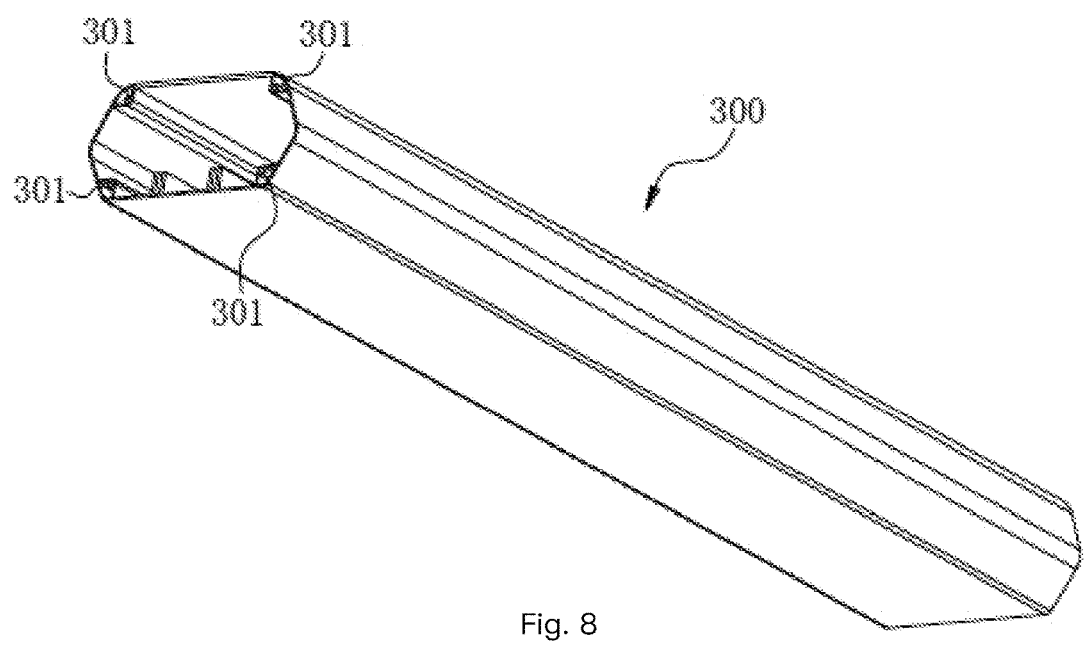
FIG. 8 illustrates central bar housing.

FIG. 8 shows a central bar housing 300. The central bar housing 300 includes connecting columns 301 to integrate multiple units to a tubular shape.

Figure 9:
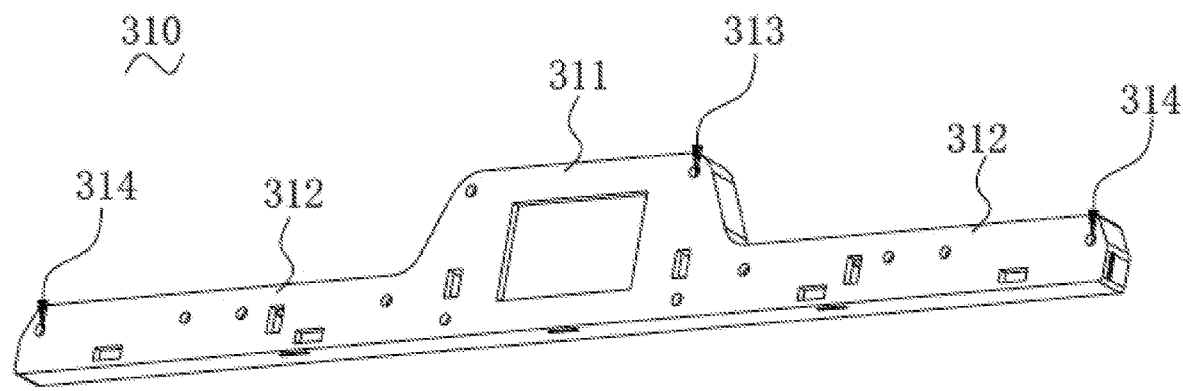
FIG. 9 illustrates a side housing.

FIG. 9 shows an end cover 310 of a side housing. The end cover 310 has a first portion 311 corresponding to the central bar housing. Through aligning holes 313, 314 are disposed for aligning and connecting to other components.

The second part 312 of the end cover 310 are used for attaching light modules of the first set of LED modules and the second set of LED modules.

Figure 10:
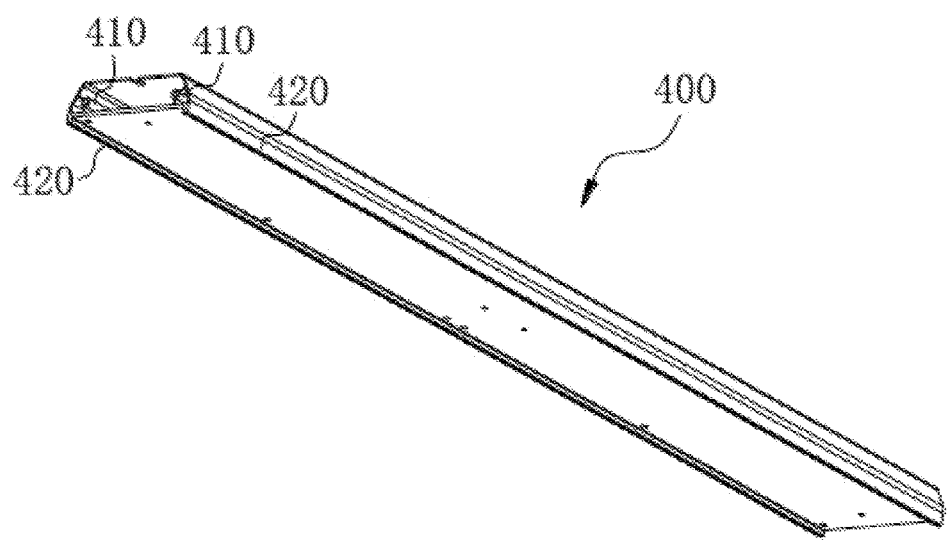
FIG. 10 illustrates a heat sink unit.

FIG. 10 shows a light module example. A heat sink plate 400 has multiple connecting columns 410 with holding edges 420 to mount lenses.

Figure 11:
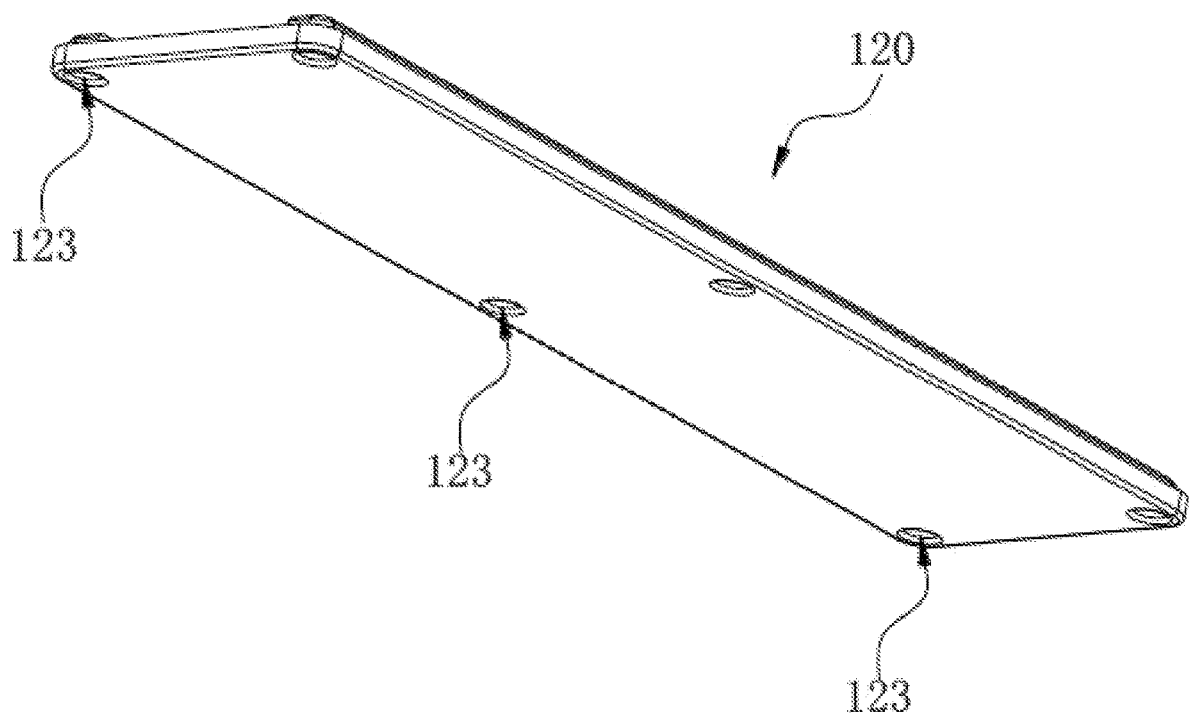
FIG. 11 illustrates a lens example.

FIG. 11 show an example of a lens 120 to be added to the heat sink plate 400.

There are several aligning holes 123 to attach the lens to the heat sink plate 400.

Figure 12:
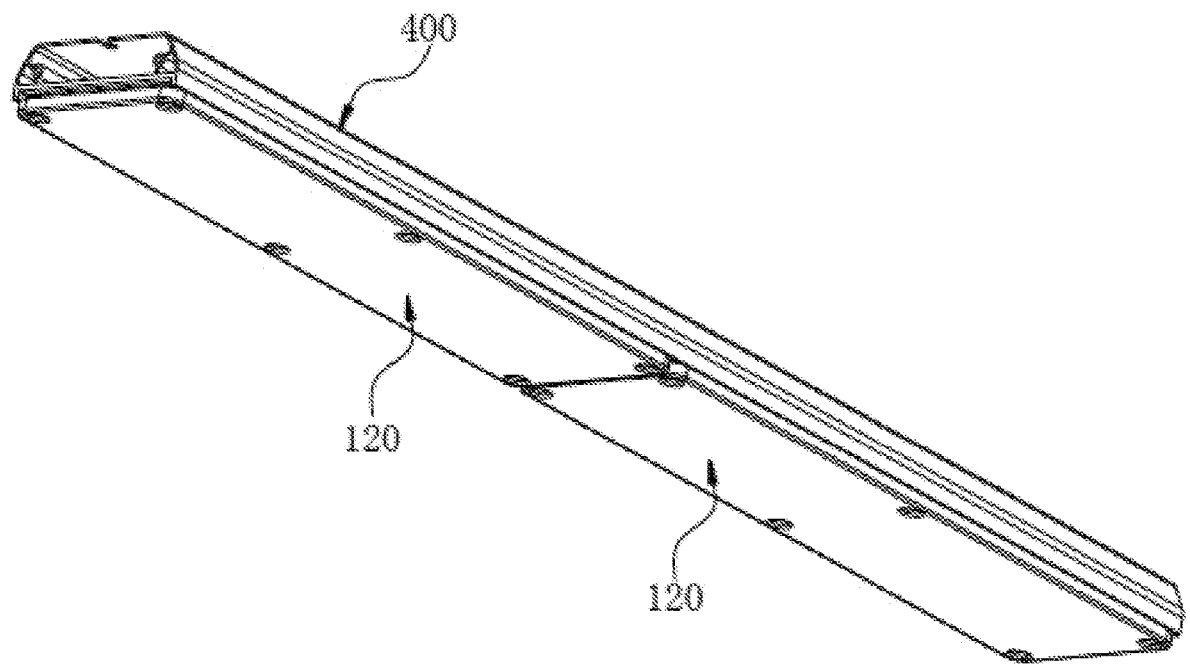
FIG. 12 illustrates a light module with a lens example.

FIG. 12 shows an example when combining the lens 120 with the heat sink plate 400.

Figure 13:
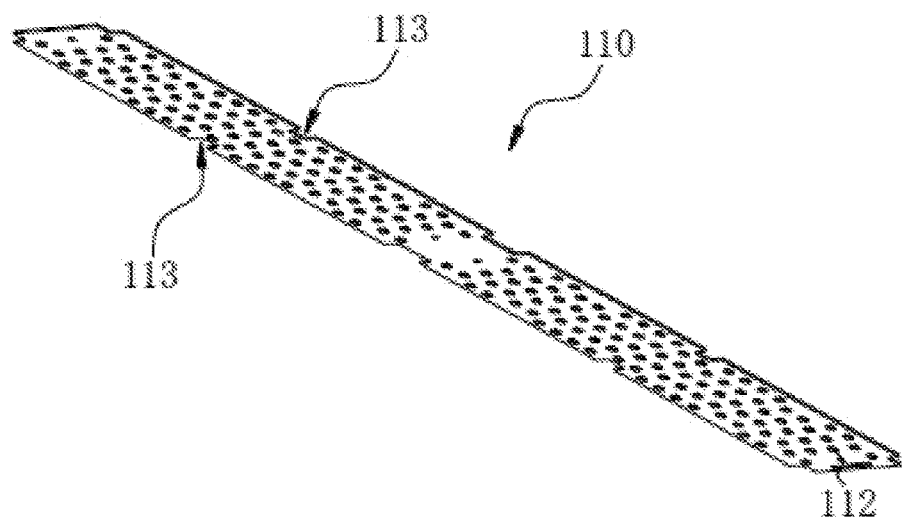
FIG. 13 illustrates a light source plate example.

FIG. 13 shows a light source plate 110 mounted with the second set of LED modules 112. There are several aligning grooves 113 for mounting LED modules.

FIG. 14 shows a configuration with two columns of light modules.

FIG. 15 shows a configuration with six columns of light modules. The same central bar housing may be used in two configurations as illustrated in FIG. 14 and FIG. 15 while using corresponding side housing. This design provides flexibility and decreases overall cost.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
a first set of LED modules;
a second set of LED modules;
a first lens covering the first set of LED modules;
a second lens covering the second set of LED modules; and
a driver for supplying a first driving current and a second driving current respectively to the first set of LED module and the second set of LED modules, and selectively turning on and turning off the first set of LED modules and the second set of LED modules in a first mode and in a second mode, wherein in the first mode, the first set of LED modules are turned on and the second set of LED modules are turned off, and the first lens guides a first light of the first set of LED modules to form a first light span, and wherein in the second mode, the second set of LED modules are turned on and the first set of LED modules are turned off, and the second lens guides a second light of the second set of LED modules to form a second light span, the first light span is partially overlapping the second light span and has a smaller span angle than the second light span.

2. The lighting apparatus of claim 1, wherein the first light span is completely covered by the second light span.

3. The lighting apparatus of claim 2, wherein the second light has a lower color temperature than the first light.

4. The lighting apparatus of claim 1, wherein the first set of LED modules and the second set of LED modules are not turned on at the same time.

5. The lighting apparatus of claim 1, wherein the first lens has multiple sub-lenses respectively covering each of the first set of LED modules, the multiple sub-lenses have different guiding angles with respect to an installation plane for mounting the first set of LED modules.

6. The lighting apparatus of claim 1, wherein the first set of LED modules and the second set of LED modules are arranged in an alternating order.

7. The lighting apparatus of claim 1, wherein the driver controls a first intensity of the first set of LED modules and controls a second intensity of the second set of LED modules to adjust an output light span of the lighting apparatus.

8. The lighting apparatus of claim 1, further comprising a third set of LED modules to emit a main light, wherein the main light accompanies the first light or the second light to form an output light span.

9. The lighting apparatus of claim 1, wherein the first set of LED modules and the second set of LED modules emit different light colors.

10. The lighting apparatus of claim 1, wherein the first set of LED modules and the second set of LED modules are the same type of LED modules placed on a single light source plate while respectively facing the first lens and the second lens of different parameters.

11. The lighting apparatus of claim 10, wherein the first lens and the second lens are formed on a single lens plate.

12. The lighting apparatus of claim 1, wherein the first lens and the second lens are detachably attached to the lighting apparatus to be selectively replaced with lenses of another parameter.

13. The lighting apparatus of claim 1, further comprising a central bar housing for disposing the driver, wherein the central bar housing has connectors to insert the first set of LED modules and the second set of LED modules.

14. The lighting apparatus of claim 13, wherein two side housings are connected on two opposite sides of the central bar housing for holding the first set of LED modules and the second set of LED modules.

15. The lighting apparatus of claim 14, wherein the side housings are detachably connected to the central bar housing to be replaced with another side housings if a different number of the first set of LED modules and the second set of LED modules are inserted.

16. The lighting apparatus of claim 13, wherein a third set of the LED modules are disposed on the central bar housing to generate a main light.

17. The lighting apparatus of claim 13, wherein the first set of LED modules and the second set of LED modules are composed of multiple light modules to be attached to the central bar for receiving the driving current.

18. The lighting apparatus of claim 13, wherein the first set of LED modules and the first lens are integrated as a first module, the second set of LED modules and the second lens are integrated as a second module, the first module and the second module are detachably plugged to the central housing.

19. The lighting apparatus of claim 1, wherein the first set of LED modules are disposed at a center position of the lighting apparatus and the second set of LED modules are disposed at a peripheral position of the lighting apparatus.

20. The lighting apparatus of claim 1, wherein the driver determines to switch to the first mode or the second mode according to a motion detection message indicating whether there is an object around the lighting apparatus.

* * * * *